Jan. 2, 1968   J. F. BELSANTI ETAL   3,361,007
ENGINE LUBRICATION AND PISTON COOLING
Filed March 7, 1966
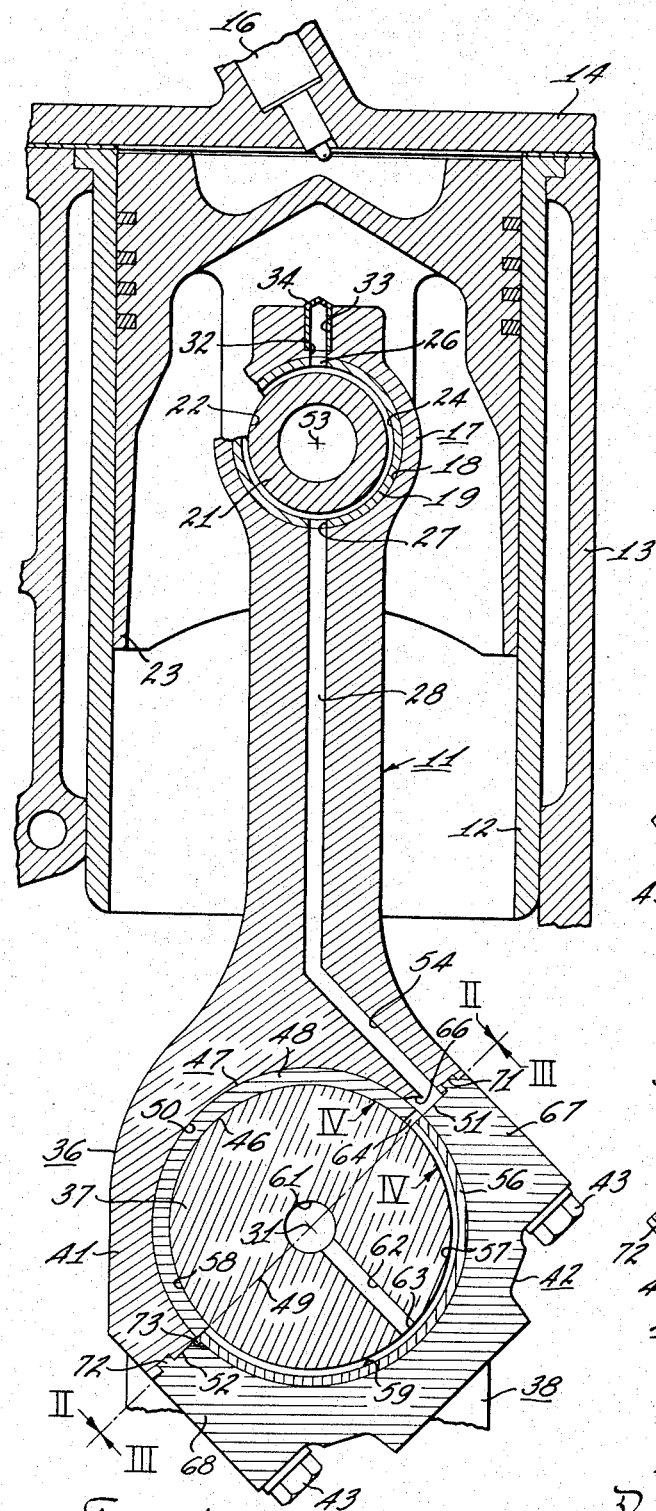
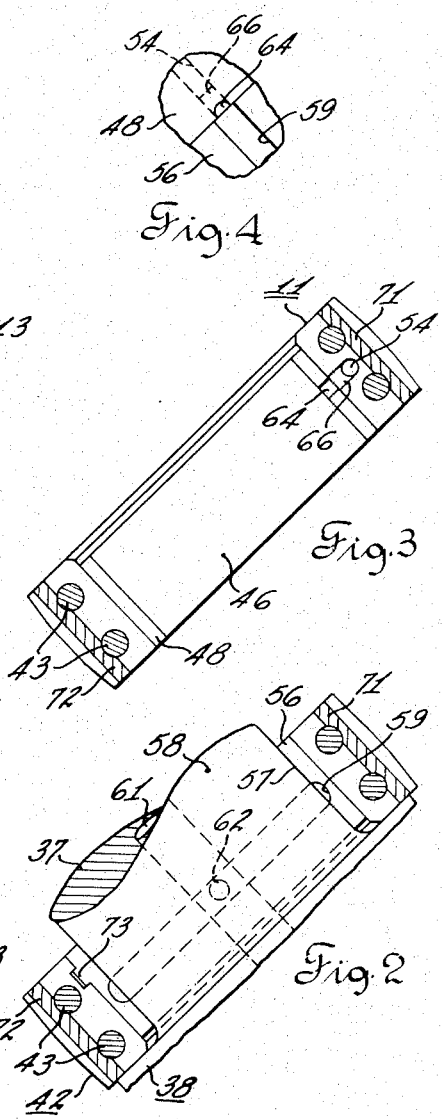
Fig. 4
Fig. 3
Fig. 2
Fig. 1
Inventors
James F. Belsanti
Albert C. Krugler
Attorney 3,361,007
ENGINE LUBRICATION AND PISTON COOLING
James F. Belsanti, Blue Island, and Albert C. Krugler, Riverdale, Ill., assignors to Allis-Chalmers Manufacturing Company, Milwaukee, Wis.
Filed Mar. 7, 1966, Ser. No. 532,213
6 Claims. (Cl. 74—587)

ABSTRACT OF THE DISCLOSURE

A connecting rod bearing lubricating the cooling means permitting maximum bearing pressure and power delivery.

---

This invention relates to means for providing lubrication and cooling of engine parts and particularly to the construction of a connecting rod.

Heretofore cooling and lubricating oil has been conveyed to the wrist pin and piston through drilled connecting rods which have annular grooves in their crankpin bearing portion or their crankpin bearing sleeve or both. Such prior art arrangements are shown for instance in U.S. Patents 2,142,175, 2,193,684 and 2,200,051. When the uppermost part of the crankpin bearing surface of either the bearing sleeve or connecting rod is grooved, bearing surface area is lost and the effective axial width of the bearing is reduced. This may undesirably result in a longer, heavier more expensive engine.

When it is desired to obtain more power from a given engine as by turbocharging, the thrust transmitted by the connecting rod to the crankpin is increased and it becomes particularly desirable to use the full width of the crankpin bearing to carry the increased power load, particularly the full width of the upper portion of the crankpin bearing since it is subjected to greatest load.

It is an object of this invention to provide an improved connecting rod construction having fluid passages for engine lubrication and cooling which do not reduce the effective axial width of the upper crankpin bearing surface.

It is a further object of this invention to provide a connecting rod for an engine having a minimum of drilled passages to convey oil from the crankpin to the pivot connection with the piston.

It is a further object of this invention to provide an improved connecting rod which requires minimum axial space, is economically manufactured and has long life in operation.

These and other objects and advantages of this invention will be apparent when the following description is read in conjunction with the drawings in which:

FIG. 1 is a section view of a connecting rod incorporating the present invention;

FIG. 2 is a section view taken along the line II—II in FIG. 1;

FIG. 3 is a section view taken along the line III—III in FIG. 1; and

FIG. 4 is a section view taken along the line IV—IV in FIG. 1.

Referring to FIG. 1, the connecting rod 11 of this invention is shown in a reciprocating piston, compression ignition engine of the type having a cylinder sleeve 12 in an engine block 13 and a head 14 in which a fuel injector or nozzle 16 is installed. The connecting rod 11 has a pivot portion 17 at its upper end presenting a transverse bore 18 and bearing sleeve 19 in thrust transmitting bearing relation to a wrist pin 21 which in turn has opposite ends press fit in aligned bores in piston 23, one of the bores being designated 22. The wrist pin bearing sleeve 19 has an annular inward facing oil groove 24 positioned centrally of its axial length and diametrically opposite upper and lower radial openings 26, 27 are aligned with an oil passage 28 drilled longitudinally from the upper end of the connecting rod 11 toward the crankpin pivot axis 31. The upper portion 32 of drilled passage 28 is counterdrilled to provide an enlarged bore 33 in which a piston cooling spray nozzle 34 is press fit.

The connecting rod 11 has a crankpin bearing portion 36 at its lower end surrounding the crankpin 37 of crankshaft 38 which includes an upper bearing part 41 and a cap part 42 held together by fastening means in the form of cap screws 43. The upper bearing part 41 presents an inner semicylindrical surface 46 in engagement with the crankpin surface 58 which is uninterrupted over its uppermost part subjected to greatest power thrust loads. The surface 46 in the illustrated embodiment of the invention is formed on the upper part 48 of a two part sleeve 47, terminating on a plane 49 defined by the upper end segment 51 and the lower end segment 52 disposed at circumferentially opposite ends of the bearing surface 46. Splitting the crankpin bearing portion 36 generally along plane 49 disposed at an acute angle to a line between wrist pin pivot point 53 and crankpin axis 31, facilitates drilling an angularly disposed oil passage 54 perpendicular thereto to virtually complete the passageway for lubricating and cooling oil between the crankpin 37 and wrist pin 21. The bearing sleeve 47 is completed by a lower semicylindrical part 56 which presents a semicylindrical bearing surface 57 in radial thrust transmitting engagement with cylindrical bearing face 58 of crankpin 37 and together with surface 46 defines a cylinder about axis 31. A radially inward facing annular groove 59 is formed in bearing surface 57 which extends circumferentially 180 degrees from the junction between the upper end segment 51 and the cap part 42. In some installations it may not be necessary for the groove to have so great a length. Oil passages 61, 62 cyclically deliver oil through port 63 which cyclically registers with groove 59 during rotation of the crankshaft 38.

In order to connect the groove 59 to angularly drilled oil passage 54 a passageway is formed in the upper segment 51 of the upper bearing part 41 by a radial hole 64 in sleeve part 48 and a recess 66 in the end of segment 51 abutting cap 42. These passage means are inexpensively formed on the edges of sleeve part 48 and rod part 41 without reducing the capacity of the bearing surface 46.

The end sections 67, 68 of cap 42 have ribs 71, 72 registering with complementary grooves in segments 51, 52 and a small radially extending finger 73 fits into a notch formed in the cap 42 to prevent the bearing sleeve parts 48, 56 from rotating relative to the connecting rod 11.

This invention provides oil passage from the crankpin 37 to the pivot connection between the rod 11 and piston 23 without reducing the effectiveness of the upper portion of the crankpin bearing in carrying the load. Neither the upper sleeve part 48 or the cylindrical surface 50 of rod 11 has been recessed or grooved at its uppermost, high load area. Thus less axial space is required for the connecting rod which is of importance particularly in a V-type engine and engines subjected to increases in power output as by turbocharging. A single straight passage 54 connects the central passage 28 in the rod with the passageway extending radially from the oil groove 59 in the sleeve 47. The oil passages bypass the upper crankpin bearing surface 46 of the connecting rod and thus the full width of the surface 46 is available to carry the radial thrust load. In the illustrated embodiment of the invention the semicylindrical bearing surface 46 is virtually uninterrupted and the groove 59 in bearing surface 57 extends the full half circle distance of the lower sleeve part 56. This simplifies manufacturing of components thus effecting economy of design.

The embodiments of the invention for which an exclusive property or privilege is claimed are defined as follows:

1. A connecting rod for a reciprocating piston engine comprising:
   a pivot portion on the upper end of said rod adapted for pivotal connection with a piston and
   a crankpin bearing portion on the lower end of said rod including
      an upper bearing part defining
         a first inner semicylindrical bearing surface adapted for engagement with a crankpin and uninterrupted over the area subjected to greatest power thrust loads with
         upper and lower circumferential ends of said first semicylindrical bearing surface lying in a plane at an acute angle to a line between the center of said pivot portion and the axis of said semicylindrical bearing surface,
      a cap part defining
         a second inner semicylindrical bearing surface adapted for engagement with said crankpin and continuing with said first bearing surface to define a cylindrical surface,
         with complementary circumferential ends of said second bearing surface lying in said plane,
      means securing said cap part to said upper bearing part,
      a first drilled passage in said connecting rod extending from said pivot portion toward said axis,
      a second drilled passage in said connecting rod extending from and at angular relation to said first drilled passage to said upper circumferential end of said upper bearing part,
      an arcuate groove recessed in said second semicylindrical bearing surface extending circumferentially from the junctions between said upper part and said cap part and
      passage means adjacent the junction of said upper part and cap part connecting said second drilled passage in fluid communication with said groove.

2. The connecting rod of claim 1 wherein said first and second bearing surfaces are formed on a crankpin bearing sleeve.

3. A connecting rod for a reciprocating piston comprising:
   a pivot portion on the upper end of said rod adapted for pivotal connection with a piston and
   a crankpin bearing portion on the lower end of said rod including
      an upper bearing part defining
         a first inner semicylindrical bearing surface adapted for engagement with a crankpin and uninterrupted over the area subjected to greatest power thrust loads with
         bearing part ends generally defining a plane at an angle to a line between the center of said pivot portion and the axis of said semicylindrical bearing surface of at least thirty degrees,
      a cap part defining
         a second inner semicylindrical bearing surface adapted for engagement with said crankpin and continuing with said first bearing surface to define a cylindrical surface and
         cap part ends complementary to and engageable with said bearing part ends,
      means securing said cap part to said upper bearing part,
      a passageway in said connecting rod extending from said pivot portion toward said crankpin bearing portion,
      an arcuate groove recessed in said second semicylindrical bearing surface extending circumferentially from the upper junction between said bearing part and said cap part and
      passage means between said groove and said passageway.

4. The connecting rod of claim 3 wherein said first and second bearing surfaces are formed on a crankpin bearing sleeve.

5. A connecting rod for a reciprocating piston comprising:
   a pivot portion on the upper end of said rod adapted for pivotal connection with a piston and
   a crankpin bearing portion on the lower end of said rod including
      an upper bearing part defining
         a first inner semicylindrical bearing surface adapted for engagement with a crankpin, with
         end surfaces at opposite circumferential ends of said first bearing surface generally defining a plane at an angle to a line between the center of said pivot portion and the axis of said semicylindrical bearing surface of at least thirty degrees,
      a cap part defining
         a second inner semicylindrical bearing surface adapted for engagement with said crankpin and continuing with said first bearing surface to define a cylindrical surface and
         end surfaces complementary to and engageable with said end surface of said upper part,
      means securing said cap part to said upper bearing part,
      a passageway in said connecting rod extending from said pivot portion toward said crankpin bearing portion,
      an annular groove recessed in said second semicylindrical bearing surface extending circumferentially from a junction of said end surfaces on said cap part and bearing part and
      passage means between said groove and said passageway.

6. The connecting rod of claim 5 wherein said first and second bearing surfaces are formed on a crankpin bearing sleeve.

References Cited

German printed application, 1,008,527, May 16, 1957.
German printed application, 1,025,674, Mar. 6, 1958.

FRED C. MATTERN, JR., *Primary Examiner.*